United States Patent

Koroki et al.

[11] Patent Number: 4,606,101
[45] Date of Patent: Aug. 19, 1986

[54] METHOD OF MANUFACTURING A RADIALLY CORRUGATED EXPANDER-SPACER FOR A PISTON OIL RING ASSEMBLY

[75] Inventors: Takeo Koroki, Tokyo; Koji Takeuchi, Saitama, both of Japan

[73] Assignee: Nippon Piston Ring Co., Ltd., Tokyo, Japan

[21] Appl. No.: 721,703

[22] Filed: Apr. 10, 1985

[30] Foreign Application Priority Data

Apr. 12, 1985 [JP] Japan ................................ 59-71882

[51] Int. Cl.$^4$ ...................... B23P 15/06; B29C 35/00; F02F 5/00
[52] U.S. Cl. .............................. 29/156.5 R; 29/156.6; 29/527.1; 29/530; 29/DIG. 24; 29/DIG. 25; 29/DIG. 29; 123/1 R; 264/254; 264/267; 267/1.5; 277/139
[58] Field of Search ............ 29/156.5 R, 156.6, 527.1, 29/530, DIG. 24, DIG. 25, DIG. 29; 123/193 CP, 193 P, 1 R; 264/22, 251, 254, 267; 267/1.5; 277/139, 157, 160, 161, 236

[56] References Cited

U.S. PATENT DOCUMENTS

| | | | |
|---|---|---|---|
| 3,338,582 | 8/1967 | De Bruin | 277/139 X |
| 3,346,252 | 10/1967 | Saylor | 267/1.5 |
| 3,356,375 | 12/1967 | Harris | 277/139 X |
| 3,427,014 | 2/1969 | De Bruin | 277/139 X |
| 3,834,716 | 9/1974 | Okada | 267/1.5 X |
| 3,934,886 | 1/1976 | Okada | 277/139 X |
| 4,059,278 | 11/1977 | Saylor et al. | 277/139 |
| 4,218,494 | 8/1980 | Belmondo et al. | 29/156.6 X |
| 4,247,972 | 2/1981 | Hendrixon et al. | 29/156.6 X |

OTHER PUBLICATIONS

Hampel et al.; *Glossary of Chemical Terms*, Second Edition; Van Nostrand Reinhold Company, Inc. (1982); pp. 282–283, "Thermoplastic", Thermoset.
Japanese Industrial Standard–Testing Methods for Strength Properties of Adhesives in Shear by Tension Loading, JIS-K-6850 (English Trans.); Japanese Standards Assoc. (1972).

*Primary Examiner*—Howard N. Goldberg
*Assistant Examiner*—R. S. Wallace
*Attorney, Agent, or Firm*—Finnegan, Henderson, Farabow, Garrett & Dunner

[57] ABSTRACT

Method of manufacturing a radially corrugated expander-spacer for a piston oil ring assembly, having inner and outer crowns alternately and successively laid, which can prevent its both terminal ends from nesting together during assembling of the piston oil ring assembly. The inner crowns each includes an inner peripheral piece and an opening having a circumferential width larger than that of the inner peripheral piece, and the outer crowns each includes an outer peripheral piece and an opening having a circumferential width larger than that of the outer peripheral piece. The manufacturing method comprises the steps of filling thermosetting synthetic resin having bonding force with respect to metals into the openings of inner crowns at both terminal ends of the expander-spacer, and thereafter, setting the thus filled thermosetting synthetic resin so that the resin is fixedly secured to the openings of the inner crowns at both terminal ends of the expander-spacer. The resin is preferably fixed by irradiating ultraviolet rays thereto.

4 Claims, 5 Drawing Figures

METHOD OF MANUFACTURING A RADIALLY CORRUGATED EXPANDER-SPACER FOR A PISTON OIL RING ASSEMBLY

BACKGROUND OF THE INVENTION

The present invention relates to a radially corrugated expander-spacer for an engine piston oil ring assembly in which an expander-spacer 4 is used in combination with side rails, S.

Oil ring assemblies used in internal combustion engines are generally classified into two groups, that is, piston oil rings made of cast-iron, and piston oil ring assemblies composed of an expander-spacer and side rails in combination.

The present invention concerns, particularly, the later-mentioned piston oil ring assembly. More specifically, as shown in FIG. 1, a piston oil ring assembly R includes in combination, side rails S, S and a corrugated expander-spacer 4 which will be hereinbelow denoted simply as "expander-spacer". As shown in FIG. 2, in the expander inner and outer crowns 2, 3 are alternately and successively provided. The inner crowns 2 each including an inner peripheral piece 201 have a length A and an opening having a width B longer than the length A, and the outer crowns each including an outer peripheral piece 301 have a length C and an opening having a width D longer than the length C.

Piston oil ring assemblies R each including the above-mentioned expander-spacer 4 have been widely used and have offered good results.

However, the above-mentioned expander-spacer sometimes causes disadvantages when it is disposed into a piston ring groove formed in the piston. That is, when side rails S, S are inserted into the piston ring groove into which the expander-spacer 4 has been previously set, both terminal ends 41 of the expander-spacers 4 are possibly in many instances overlapped together, as shown in FIG. 2. Therefore, there is a risk such that the piston oil ring assembly is inserted into an engine cylinder as is in this condition. It is noted here that the expander-spacer can be inserted in the piston ring groove even if both terminal ends of the expander-spacer are overlapped together, as shown in FIG. 2, since a slight gap is usually designed to be obtained between the inner peripheral pieces and the bottom of the piston ring groove in the condition in which a piston incorporated therein with the expander-spacer is fitted in an engine cylinder. However, this lowers the intrinsic self-expanding function of the expander-spacer.

If the piston is fitted in the engine in the condition in which the both terminal ends of the expander-spacer are overlapped together, this overlapping naturally causes the expander-spacer not to provide radially outwardly expanding force and therefore, the expander-spacer cannot transmit its tension force to the side rails through the projections. As a result, oil loss or oil-up through the piston oil ring assembly is increased, not only incurring various engine troubles such as an increase in oil consumption, sticking of rings, etc., but also causing, in the worst case, an engine failure.

Therefore, various studies and developments have been made to obtain countermeasures to prevent the terminal ends of the expander-spacer from their overlap. One example of such measures is disclosed in U.S. Pat. No. 3,427,014, in which synthetic resin blocks are mechanically coupled to both terminal ends of the expander-spacers, thereby the overlapping of both terminal ends can be prevented.

Further, Japanese Utility Model Publication No. 47132/76 proposes the provision of block slip-off preventing pieces for preventing the above-mentioned synthetic resin blocks attached to the terminal ends of the expander-spacer from being released therefrom.

However, the mechanical coupling of the above-mentioned synthetic resin blocks (which requires making apertures in the inner peripheral pieces) are inapplicable to an expander-spacer having a small axial-breadth (B dimension of FIG. 2) which has been widely available these days as one of means for making light-weight engines and for energy-saving. That is, complicated designs should have to be taken in order to mechanically couple the synthetic blocks to the terminal ends of the expander-spacer.

Further, in case of the provision of the later-mentioned block slip-off preventing pieces, an additional production step is required to accommodate the pieces, which increases the cost the entire manufacturing process.

SUMMARY OF THE INVENTION

In view of the above, one object of the present invention is to provide a method of manufacturing expander-spacers which eliminates the above-mentioned drawbacks.

According to the present invention, the inner crowns at terminal ends, i.e., the lip portion, of the expander, are subjected to filling with thermosetting resin, which resin bonds strongly to the metal comprising the inner crowns. The resin is fixedly secured to the crowns upon setting so that complex steps can be eliminated.

Other objects, features and advantages of the present invention will become apparent from the following detailed description taken in conjunction with the accompanying drawings wherein:

DESCRIPTION OF THE PREFERRED EMBODIMENT

Figure 1:
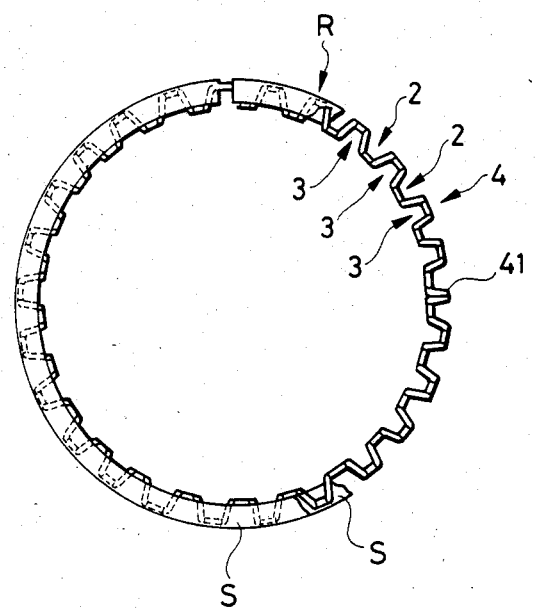
FIG. 1 is a plan view showing a conventional radially corrugated expander-spacer.
Figure 2:
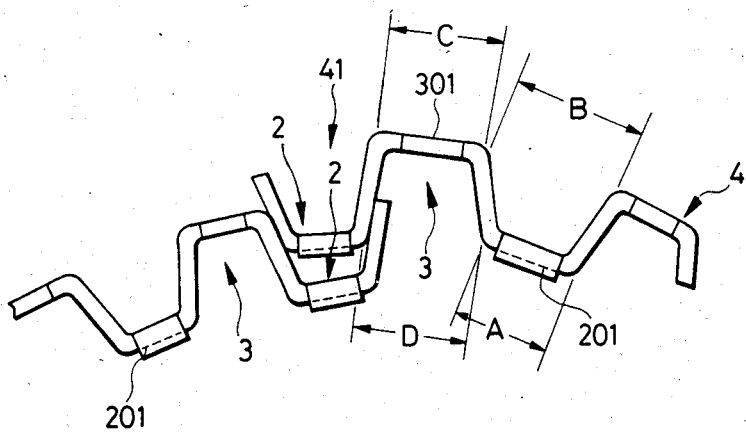
FIG. 2 is a fragmentary enlarged view showing both terminal ends of the expander-spacers being overlapped together.
Figure 3:
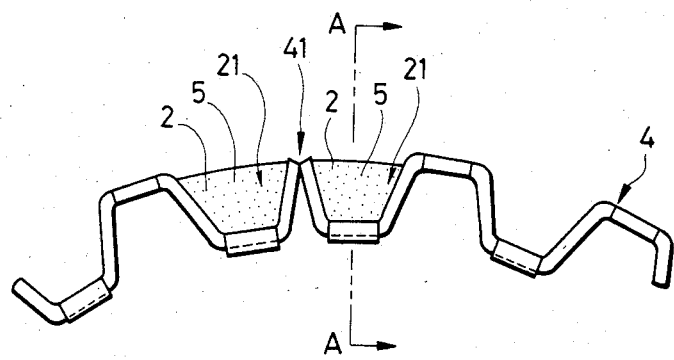
FIG. 3 is an enlarged plan view showing both terminal ends of an expander-spacer according to the present invention.

First referring to FIG. 3, thermosetting synthetic resin 5 is filled in the openings 21 of inner crowns 2 at both terminal ends 41 of an expander-spacer 4, and thereafter ultraviolet rays or the like are irradiated onto the synthetic resin 5 to set the latter. By this setting the above-mentioned thermosetting synthetic resin is surely made into contact with and is fixedly bonded to both terminal ends 41 of the expander-spacer. The most preferably synthetic resin is acrylate synthetic resin.

Figure 4:
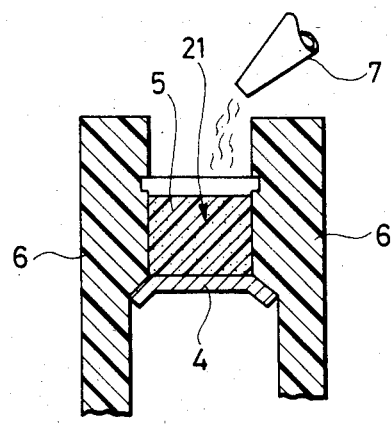
FIGS. 4 and 5 are the cross-sectional views of the expander-spacer along the line A—A of FIG. 3, which are shown for explaining the steps of the method of manufacturing the expander-spacer according to the present invention.

For filling the above-mentioned synthetic resin 5 into the openings 21 of the inner crowns 2 at both terminal ends 41 of the expander-spacer, it is preferable to dispose side plates 6 made of high-polymer materials, at both axial ends of the crowns 2, as shown in FIG. 4, so as to prevent the thermosetting synthetic resin from leaking out of the crowns before the resin is filled in the openings 21 by a filling device 7.

Figure 5:
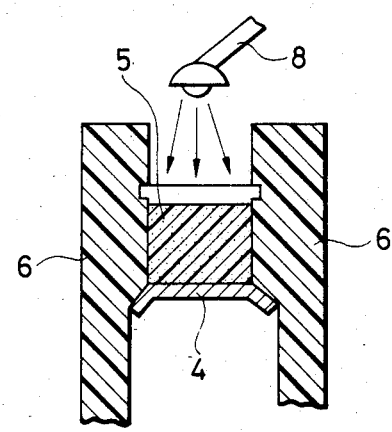

Then, ultraviolet rays are irradiated onto the thermosetting resin by an ultraviolet radiation device 8 to set and secure the resin to the crowns, as shown in FIG. 5. The side plates are removed after setting and securing to the crowns, and the thus obtained thermosetting resin is fixedly secured to the openings of the inner crowns at both terminal ends of the expander-spacer, as shown in FIG. 3.

If acrylate resin is used, the resin can have, after thermosetting, 75 BARCHOL (934-1) hardness; 120 kg/cm$^2$ tensile strength (glass/steel); and 240 kg/cm$^2$ tensile/shear strength (glass/steel), and also bonds strongly to the metals forming the inner crowns 2 at the terminal ends 41, and therefore, it has been confirmed that overlapping of the terminal ends of the expander-spacer can be surely prevented. In testing the expander-spacer, it is inserted in a piston ring groove of a piston with both terminal ends being overlapped, and thereafter the piston is fitted in a test piece with a bore having a diameter equal to an engine cylinder. If the piston is inhibited from entering into the bore due to projection by the overlapping terminal ends, the expander-spacer is suitable as a final product. However, if the piston can be fitted into the test piece when both terminal ends are overlapped cannot be, such an expander-spacer cannot be is not suitable as a final product. The resin fitting parts are, of course, removed from the terminal ends of the expander-spacer in a final product.

It is clear from the afore-mentioned explanation that the present invention proposes a method in which thermosetting resin having bonding force with respect to metals, is filled in the openings of the inner crowns at both ends of an expander-spacer and is secured thereto by thermosetting. With this method, the thermosetting resin can be easily secured to an expander-spacer even having a small axial width, and no block slip-off preventing piece is required since the bonding force of the resin is extremely strong. Therefore, the expander-spacers produced by the method according to the present invention are advantageous in view of production cost.

Further, it is further advantageous if the inner crowns at both terminal ends of the expander-spacer are subjected to sand-blasting or the like to roughen the surface in order to provide an increased bonding area to the resin.

We claim:

1. A method of manufacturing a radially corrugated expander-spacer having two terminal ends, in which inner and outer crowns are alternately and successively laid, said inner crowns each including an inner peripheral piece having a length and an opening having a width which is larger than the length of said inner peripheral piece, and said outer crowns each including an outer peripheral piece having a length and an opening having a width which is larger than the length of said outer peripheral piece, said method comprising the steps of:

filling thermosetting synthetic resin that bonds strongly to metals into the openings of the inner crowns located at said two terminal ends; and curing said thus filled thermosetting synthetic resin, thereby bonding said thermosetting synthetic resin to the openings of said inner crowns at said two terminal ends.

2. A method of manufacturing a radially corrugated expander-spacer as set forth in claim 1, wherein said thermosetting synthetic resin is acrylate synthetic resin.

3. A method of claim 1, further comprising the step of disposing a pair of plate members at both axial ends of said openings at said terminal ends prior to said filling step.

4. A method of claim 1, wherein said thermosetting synthetic resin is fixed by irradiating ultraviolet rays.

* * * * *